(12) United States Patent
Aiello

(10) Patent No.: US 10,540,560 B2
(45) Date of Patent: Jan. 21, 2020

(54) DEVICE AND METHOD FOR DECODING MAGNETIC PATTERNS

(71) Applicant: Shenzhen Pu Ying Innovation Technology Corporation Limited, Shenzhen (CN)

(72) Inventor: Sergio Aiello, Ivrea (IT)

(73) Assignee: SHENZHEN PU YING INNOVATION TECHNOLOGY CORPORATION LIMITED, Hezhou, Bao An, Shenzhen (CN)

( * ) Notice: Subject to any disclaimer, the term of this patent is extended or adjusted under 35 U.S.C. 154(b) by 219 days.

(21) Appl. No.: 15/107,125

(22) PCT Filed: Dec. 23, 2013

(86) PCT No.: PCT/IB2013/061275
§ 371 (c)(1),
(2) Date: Jun. 22, 2016

(87) PCT Pub. No.: WO2015/097496
PCT Pub. Date: Jul. 2, 2015

(65) Prior Publication Data
US 2017/0024628 A1    Jan. 26, 2017

(51) Int. Cl.
*G07D 7/04* (2016.01)
*G06K 9/18* (2006.01)
(Continued)

(52) U.S. Cl.
CPC ............. *G06K 9/186* (2013.01); *G06K 7/087* (2013.01); *G06K 9/40* (2013.01); *G07D 7/02* (2013.01); *G07D 7/04* (2013.01); *G11B 5/035* (2013.01); *G11B 20/10009* (2013.01)

(58) Field of Classification Search
CPC .. G07D 7/01; G07D 7/02; G07D 7/04; G07D 7/06; G07D 7/12; G07D 7/20;
(Continued)

(56) References Cited

U.S. PATENT DOCUMENTS 3,938,089 A * 2/1976 McGregor ............... G06K 9/03
                                                  382/318
4,053,737 A * 10/1977 Lafevers ................. G06K 9/03
                                                  235/449

(Continued)

FOREIGN PATENT DOCUMENTS

| CN | 102369558 A | 3/2012 |
| CN | 102592349 A | 7/2012 |
| CN | 102592350 A | 7/2012 |

*Primary Examiner* — Jeffrey A Shapiro
(74) *Attorney, Agent, or Firm* — Howson & Howson LLP

(57) ABSTRACT

A device for decoding magnetic patterns printed on documents comprising a reading head (12) having: a reader (20) arranged to read first magnetic signals belonging to the magnetic patterns and to electromagnetic noise due to sources internal and/or external to the device. The device further comprises: a further reader (40), arranged to read second magnetic signals belonging to the electromagnetic noise, an adder component (25) arranged to algebraically subtract the amplified second magnetic signals from the amplified first magnetic signals, and a converter (16) arranged to convert the resulting signal into a digital signal representing the read magnetic patterns. A method for decoding magnetic patterns is also disclosed.

12 Claims, 6 Drawing Sheets

(51) Int. Cl.
*G06K 7/08* (2006.01)
*G06K 9/40* (2006.01)
*G07D 7/02* (2016.01)
*G11B 20/10* (2006.01)
*G11B 5/035* (2006.01)

(58) Field of Classification Search
CPC ........... G07D 11/0066; G07D 11/0084; G07D 7/004; G07D 7/0043; G07D 7/0047; G07D 7/005; G07D 7/0051; G07D 7/0053; G07D 7/0054; G07D 7/0055; G07D 7/0056; G07D 7/0057; G11B 5/00; G11B 20/10009; G11B 27/36; G11B 5/035; G11B 20/10046; G11B 5/012; G11B 5/024; G11B 5/03; G11B 2005/0018; G11B 2020/10851; G11B 15/02; G11B 19/02; G11B 5/17; G11B 5/1278; G11B 5/3116; G11B 5/3123; G11B 5/127; G11B 5/11; G11B 5/3133; G11B 5/314; G11B 5/40; G11B 5/41; G11B 5/10; G07F 7/00; G07F 7/02; G07F 7/10; G06K 7/087; G06K 9/40; G06K 9/00469; G06K 9/18; G06K 2017/0038; G06K 9/00442; G06K 9/183; G06K 9/186; G06K 7/082; G06K 7/00; G06K 7/08; G06K 7/081; G06K 7/084; G06K 19/00; G06K 19/06046; G06K 19/06187; G06K 19/06196; G06K 19/08; G06K 19/04; G06K 19/06; G06Q 20/042; G06Q 20/3276; B07C 5/34; B07C 5/344; B07C 3/02; B60W 2420/50; B65H 2553/822; G01L 5/0023
USPC ........ 194/207, 210–213; 209/534, 567, 569; 235/439, 440, 449, 450, 451, 493; 382/137–140; 360/25, 63, 65, 66, 123, 360/124, 123.01, 123.11, 125.01, 128, 360/129

See application file for complete search history.

(56) References Cited

U.S. PATENT DOCUMENTS

| | | | | |
|---|---|---|---|---|
| 4,058,706 | A * | 11/1977 | Kao | G06K 9/186 235/449 |
| 4,080,528 | A * | 3/1978 | Kao | G06K 9/186 235/449 |
| 4,097,910 | A * | 6/1978 | Lafevers | G06K 7/084 235/449 |
| 4,593,184 | A * | 6/1986 | Bryce | G07D 7/04 194/206 |
| 4,996,677 | A * | 2/1991 | Naito | G06K 7/087 360/121 |
| 5,151,607 | A * | 9/1992 | Crane | G07D 7/04 250/556 |
| 5,418,458 | A * | 5/1995 | Jeffers | G01R 33/09 194/213 |
| 5,444,678 | A * | 8/1995 | Ogata | G11B 11/10534 360/234.7 |
| 5,545,885 | A * | 8/1996 | Jagielinski | G06K 7/084 235/449 |
| 5,887,075 | A * | 3/1999 | Kruppa | G06K 9/186 382/139 |
| 6,956,962 | B1 * | 10/2005 | Hayosh | G06K 9/186 382/139 |
| 7,378,674 | B2 * | 5/2008 | Chen | G06Q 20/102 209/569 |
| 7,434,732 | B2 * | 10/2008 | Buttifant | G06K 7/084 235/449 |
| 7,722,025 | B2 | 5/2010 | Giacometto et al. | |
| 8,540,142 | B1 * | 9/2013 | Lewis | G06Q 40/02 235/379 |
| 2008/0093453 | A1 * | 4/2008 | Endo | G06K 7/082 235/450 |
| 2010/0118424 | A1 * | 5/2010 | Buch | G11B 20/10046 360/31 |
| 2013/0098996 | A1 * | 4/2013 | Bui | G06K 7/087 235/449 |
| 2014/0081874 | A1 * | 3/2014 | Lewis | G07F 19/205 705/72 |
| 2015/0370210 | A1 * | 12/2015 | Wang | G11B 5/00808 382/139 |

* cited by examiner

DEVICE AND METHOD FOR DECODING MAGNETIC PATTERNS

TECHNICAL FIELD

The present invention relates, in general, to a device and method arranged for reading and decoding magnetic patterns printed on documents.

In particular, the present invention relates to a reading device and method provided for reading and decoding (acquiring) magnetic characters or patterns printed, for instance, on cheques issued by a Bank.

More in particular, the present invention relates to a reading device comprising a reading head arranged for reading magnetic characters, wherein, for instance, the characters are printed according to a predetermined Standard, such as, for instance, Standard E13-B (ISO 1004:1995) or Standard CMC-7 developed by Group BULL.

BACKGROUND ART

Cheques are known in the art.

Also known in the art is the Magnetic Ink Character Recognition (MICR) technology used mainly by the banking industry to ease the processing and clearance of cheques and other documents.

As is known, according to the MICR technology, magnetic characters printed on documents, in a first step are magnetically charged by means of a magnetic field and in a second step their magnetic signals are read according to the respective reading standards.

According to the known art the second step, to which the present invention relates, is made by using a device 1 (FIG. 1) comprising a reading head 2, an amplifier 5, an A/D converter 6, and a control unit (CPU) 8.

The known device is arranged to:
read the signals of the magnetic characters by means of the reading head 2;
amplify the signals by means of the amplifier 5;
sample and convert the signals into a plurality of data by means of the A/D converter 6; and
process the plurality of data by means of the CPU 8 so as to reproduce the read characters and, for instance, send them to other processing devices, per se known to the skilled person and hence not described here.

An apparatus of this type is known, for instance, from publication WO2006/005560 in the name of the Applicant that is arranged for reading, decoding and certifying documents comprising magnetic characters or patterns.

Reading of the magnetic characters, however, is adversely affected by a plurality of problems, such as, for instance:
very low magnetic field of the characters;
electromagnetic noise due to electromagnetic frequencies generated by stepping motors that are typically present in the reading devices;
electromagnetic noise due to electromagnetic frequencies generated by switching transformers that are typically present in or near the reading devices;
electromagnetic noise due to electromagnetic frequencies coming, in general, from external sources.

In summary, the magnetic low level signal of the characters and the electromagnetic noise due to a plurality of sources render it very difficult, if not impossible in certain situations, to correctly read and decode the magnetic characters.

As a matter of fact, the noise-generating electromagnetic frequencies read by the head have typically the same magnitude as the signals to be amplified.

In general, the Applicant has found that known devices, intended for implementing a reliable process of reading magnetic characters, are very complex, due, for instance, to the installation of shields on the noise-generating devices or on the head so as to indirectly or directly protect with shields the process of reading magnetic characters.

In the above cases, shielding is made by means of metal sheets located near the sources of the electromagnetic noise or near the head so as protect the head from the electromagnetic frequencies.

However, the above shields have high intrinsic and manufacturing costs.

Disclosure of the Invention

The object of the present invention is thus to solve the problem outlined above, and, at the same time, to provide a device and method that are very simple and effective.

According to the present invention, this object is achieved by means of a device and method for decoding magnetic patterns having the features set forth in the claims that follow.

Claims are an integral part of the teaching of the present invention.

The following summary of the invention is provided in order to provide a basic understanding of some aspects and features of the invention. This summary is not an extensive overview of the invention, and as such it is not intended to particularly identify key or critical elements of the invention, or to delineate the scope of the invention. Its sole purpose is to present some concepts of the invention in a simplified form as a prelude to the more detailed description that is presented below.

According to a feature of a preferred embodiment the device for decoding or reading magnetic patterns printed on documents comprises a first reader arranged to read magnetic signals belonging to the magnetic patterns and to electromagnetic noise due to sources internal and/or external to the device and a second reader arranged to read only the magnetic signals belonging to the electromagnetic noise whereby by subtracting the magnetic signals read by the second reader from the magnetic signals read by the first reader it is possible to obtain a third magnetic signal corresponding to the magnetic patterns having a high signal-to-noise ratio.

According to a further feature of the present invention the second reader may be comprised into a head arranged to read the magnetic patterns or, alternatively, located in a position separated from the head.

According to another feature of the present invention the head may be a movable head or a stationary head.

BRIEF DESCRIPTION OF DRAWINGS

These and further features and advantages of the present invention will appear more clearly from the following detailed description of preferred embodiments, provided by way of non-limiting examples with reference to the attached drawings, in which components designated by same or similar reference numerals indicate components having same or similar functionality and construction and wherein.

BEST MODES FOR CARRYING OUT THE INVENTION

Figure 1:
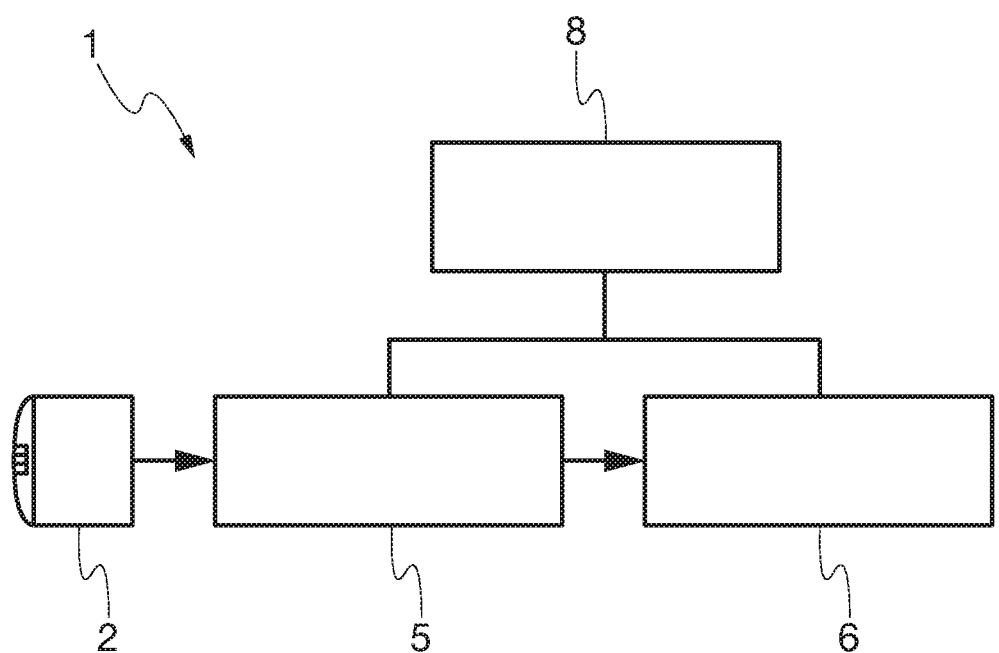
FIG. 1 schematically shows a block diagram of a device according to prior art.
Figure 2:
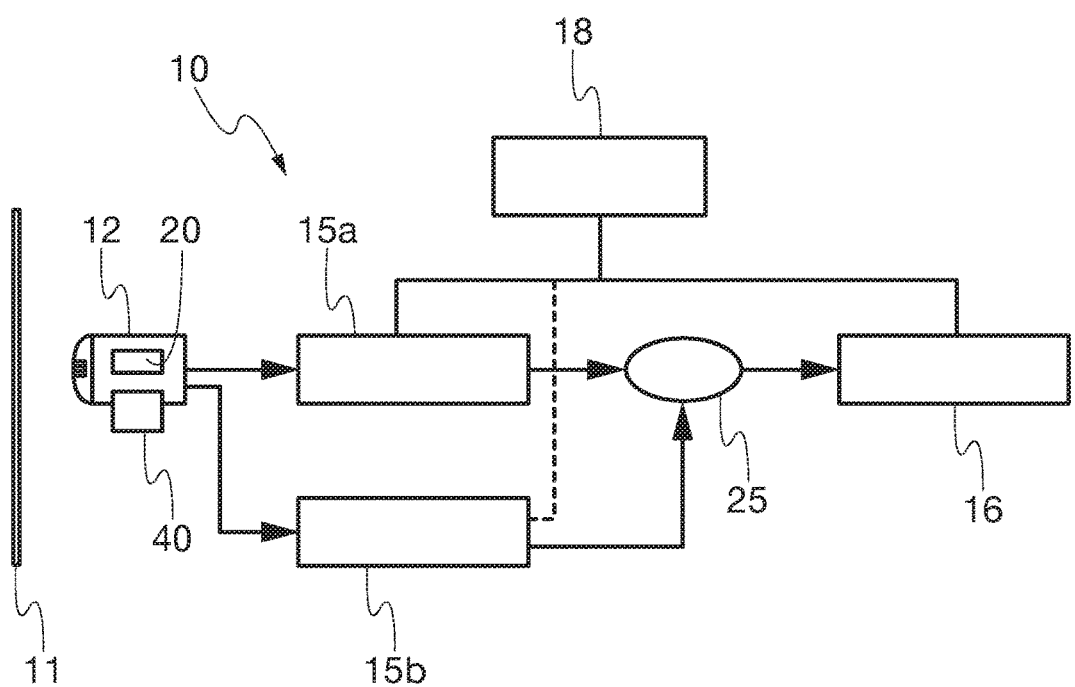
FIG. 2 schematically shows a block diagram of a device made according to a first embodiment of the present invention.

A first embodiment of the present invention is disclosed with reference to FIG. 2.

According to such first embodiment a device 10 for decoding magnetic patterns printed on documents 11 comprises a plurality of components arranged to read and reproduce magnetic patterns, such as, for instance, magnetic characters printed on bank cheques.

Preferably, such device 10 comprises a first and a second amplifier, 15a and 15b, respectively connected in output, through a component operating as an algebraic adder 25, to a converter 16, for instance an A/D converter, and a control unit (CPU) 18, known per se, connected to the above components, and arranged to control operation thereof.

Figure 3:
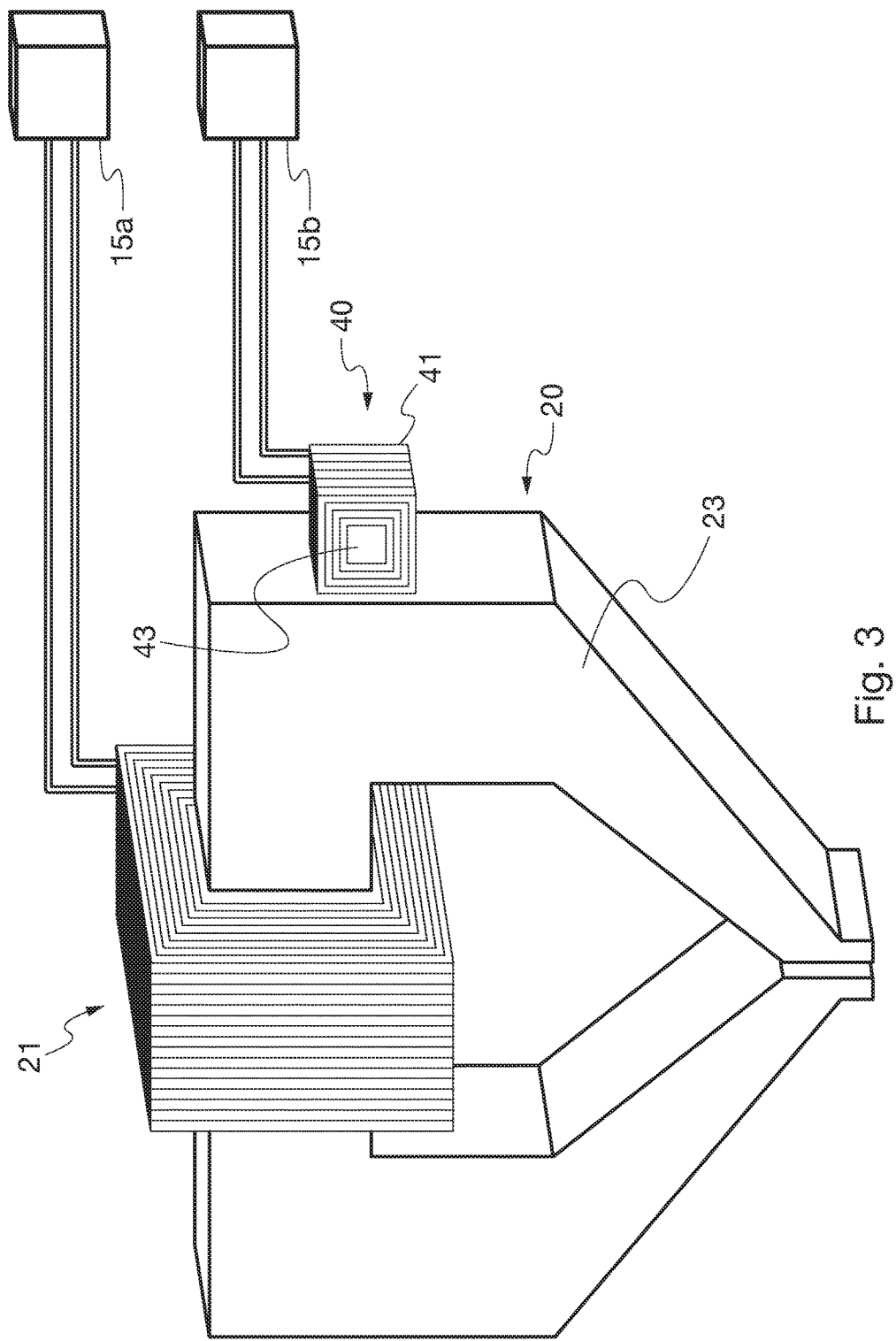
FIG. 3 schematically shows a reading head made according to the first embodiment of the invention.

Preferably, the device 10 comprises a reading head (head) 12, having a first magnetic reader 20 (FIG. 2 and FIG. 3) comprising a first magnetic core 23 and a first coil 21, connected to the first amplifier 15a, and arranged to read field magnetic signals coming from the magnetic patterns printed on the documents. The magnetic reader 20 is also sensitive to the electromagnetic noise coming from noise sources internal or external to the device.

Figure 4:
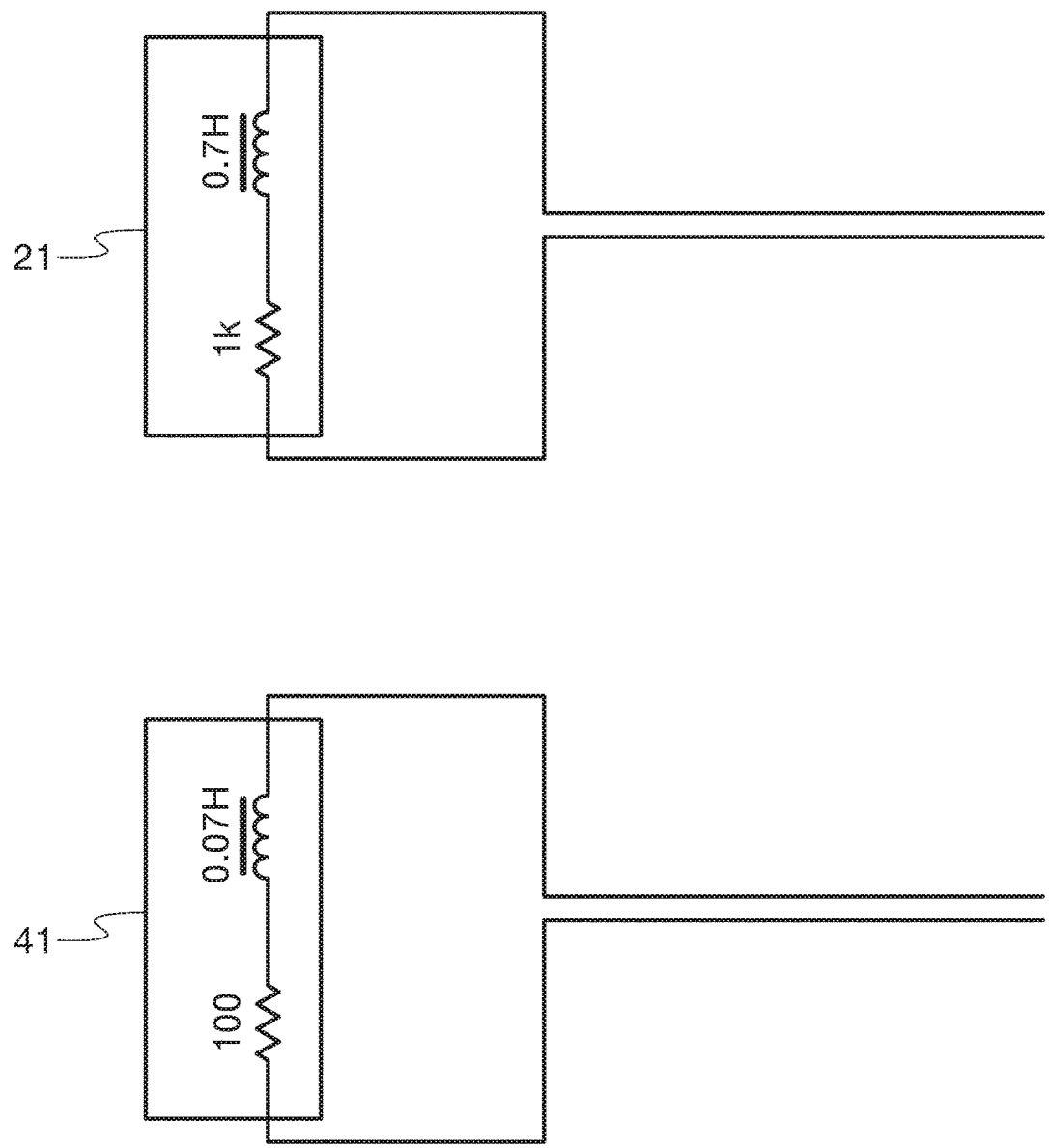
FIG. 4 shows an electric circuit embodied into the head made according to the first embodiment of the invention.

For instance, the electric circuit of the first coil 21 has, as schematically shown in FIG. 4, an inductance value of 0.7 H and an equivalent resistance value of 1 KΩ.

Preferably, in cases where the head 12, (FIG. 2, FIG. 3) is a movable head arranged to move along the documents 11 in order to read them, the head 12 further comprises, according to the first embodiment, a second magnetic reader or a dummy magnetic reader 40, comprising a second magnetic core 43 and a second coil 41, connected to the second amplifier 15b and arranged to read the electromagnetic noise coming from noise sources internal or external to the device.

According to this embodiment, the second magnetic reader 40 is mounted on the head, for instance inside or externally, so as to be magnetically decoupled from first magnetic reader 20 and in a position such as not to sense the magnetic field generated by the magnetic characters.

Applicant has experimentally verified that a rule for obtaining a decoupling of the second magnetic reader 40 from the first magnetic reader 20 is to install the second magnetic reader 40 at a distance of about 1-3 mm from the first magnetic reader 20 and from the characters. For instance, the electric circuit of the second coil 41 has, as schematically shown in FIG. 4, an inductance value of 0.07 H and an equivalent resistance value of 100 Ohms.

Preferably the two coils 21 and 41 have the same time constant ($\tau=-R/L$) in both the magnetic readers so as to grant the same quality of the signals collected therefrom.

The above structure can also be changed by connecting the two coils 21 and 41 to the algebraic adder 25 and one amplifier in output to the adder 25. Such a second configuration does not change the general structure of the first embodiment, therefore the following description discloses in detail the first configuration of the first embodiment.

The operation of the device 10 according to the first configuration of the first embodiment is as follows.

In a first step the head 12, moving along the document including magnetic patterns, is arranged to read, by means of the first magnetic reader 20, the magnetic signals belonging to the magnetic patterns and the electromagnetic noise (first magnetic signals).

At the same time, according to the disclosed architecture, the second magnetic reader 40 is arranged to read magnetic signals belonging only to the electromagnetic noise (second magnetic signals).

In a second step the first magnetic signal and the second magnetic signal are separately amplified by the respective first and second amplifier, 15a and 15b, and then, by means of the adder component 25, algebraically added by subtracting the amplified second magnetic signal from the amplified first magnetic signal in order to obtain a new amplified magnetic signal or resulting magnetic signal representing the read magnetic pattern.

Following the second step, the new magnetic signal substantially comprises a magnetic signal corresponding to the read pattern and having, thanks to the algebraic subtraction of the two amplified magnetic signals, a signal-to-noise ratio higher than that of the first magnetic signal.

In a third step the new magnetic signal is sampled and converted, in a known way, by the converter 16 into a digital signal and processed by the CPU 18 so as to represent the read magnetic patterns or characters.

Figure 5:
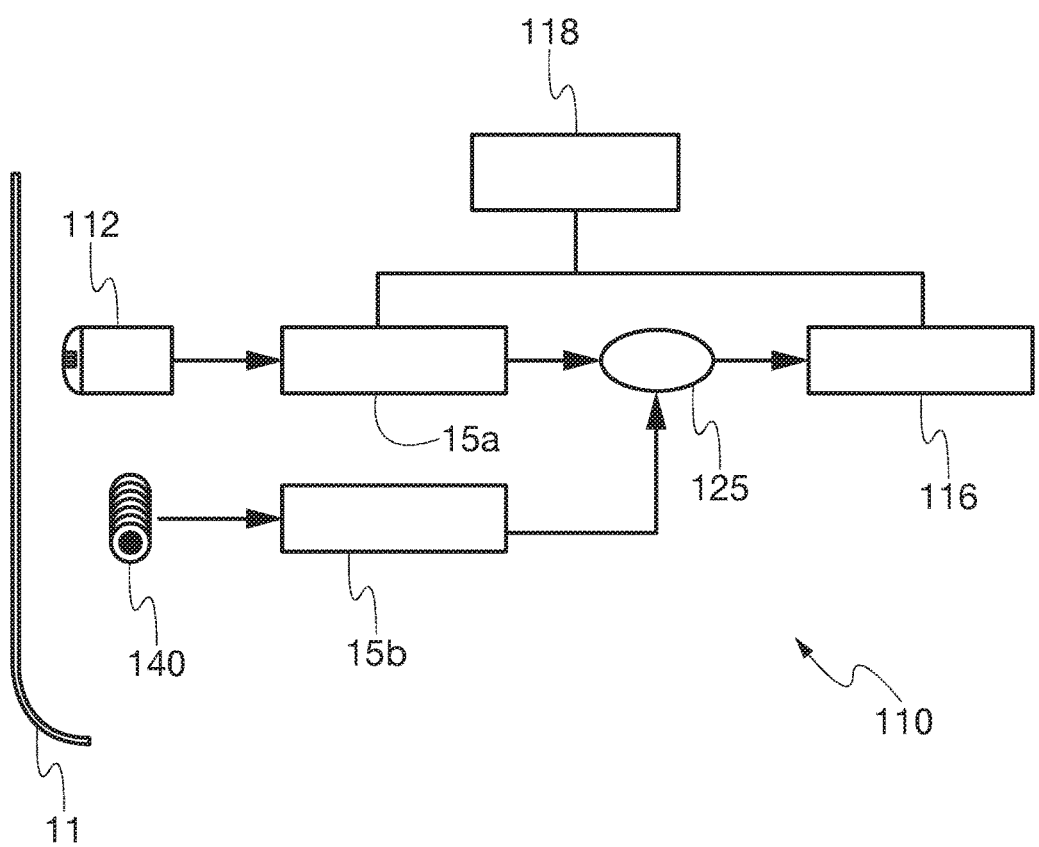
FIG. 5 schematically shows a block diagram of a device made according to a second embodiment of the present invention.

A second embodiment of the present invention is disclosed with reference to FIG. 5, wherein a device for decoding magnetic patterns (device) 110 is shown.

Such embodiment is, preferably, applicable in cases where the document 11 and the associated patterns are moved in front of a stationary head 112.

According to such second embodiment the device 110 comprises, similarly to the first embodiment, a first and a second amplifier, 115a and 115b (FIG. 5, FIG. 6), respectively connected in output, through a component operating as an algebraic adder 125, to a converter 116, for instance an A/D converter, and a control unit (CPU) 118, known per se, connected to the above components 115a, 115b, 116, and 125, and arranged to control operation thereof, said components being all of known type.

Preferably, the device 110 comprises a reading head (head) 112 having a first magnetic reader (FIG. 5 and FIG. 6) with a structure and an electric circuit substantially similar to those disclosed with reference to the first magnetic reader 20 of the first embodiment.

According to the second embodiment the device 110 further comprises a second magnetic reader 140, having, preferably, a fixed position, and a structure and an electric circuit substantially similar to those disclosed with reference to the second magnetic reader 40 of the first embodiment.

Such second magnetic reader 140 is positioned in proximity of the stationary reading head 112 so as to be magnetically decoupled from the stationary reading head 112 and in a position such as not to sense the magnetic field generated by the magnetic characters.

In particular the second magnetic reader 140 is arranged to read only the electromagnetic noise coming from noise sources internal or external to the device.

Applicant has experimentally verified that a rule for obtaining a decoupling of the second magnetic reader 140 from the stationary reading head 112 is to install the second magnetic reader 140 at a distance from the stationary reading head 112 in a range of 3-15 millimeters.

Figure 6:
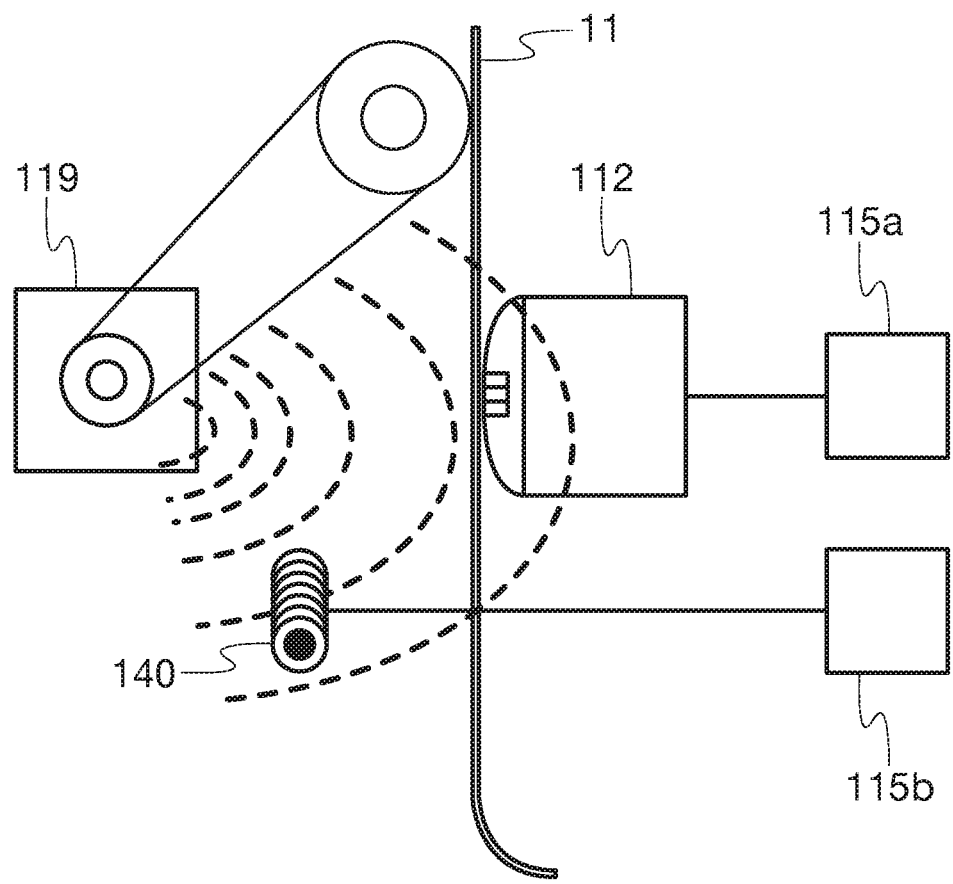
FIG. 6 schematically shows a mode of operation of the device made according to the second embodiment of the present invention.

Preferably, the second magnetic reader 140 comprises a coil mounted in proximity to the stationary head 112, for instance in front of the head 112 as schematically shown in FIG. 6.

However, any position of the second magnetic reader 140 in proximity to the head, but such as not to read magnetic patters printed on documents 11, can be used.

The second embodiment, as clearly apparent to a person skilled in the art, does not need to modify the reading head and therefore has, in general, a cost lower than that of the first embodiment.

The above structure can also be changed by connecting the head 112 and second magnetic reader 140 to the algebraic adder 125 and only one amplifier in output to the adder 125.

Such a second configuration does not change the general structure of the second embodiment, therefore the following description discloses in detail the first configuration of the second embodiment.

The operation of the device 110 according to the first configuration of the second embodiment is as follows.

In a first step document 11 is moved, for instance, step-by-step according to a certain speed, in front of the stationary head 112 that is arranged to read, by means of the first magnetic reader 112, the magnetic signals belonging to the magnetic patterns and to the electromagnetic noise (first magnetic signals).

At the same time, according to the disclosed architecture, the second magnetic reader 140 located in proximity to the stationary head 112 is arranged to read only the electromagnetic noise (second magnetic signals).

In a second step the first magnetic signal and the second magnetic signal are separately amplified by the respective first and second amplifier, 115a and 115b, and then, by means of the adder 125, algebraically added by subtracting the amplified second magnetic signal from the amplified first magnetic signal so as to obtain a new amplified magnetic signal or resulting magnetic signal representing the read magnetic pattern.

Following the second step, the new magnetic signal substantially comprises magnetic signals corresponding to the read pattern and having, thanks to the algebraic subtraction of the two amplified magnetic signals, a signal-to-noise ratio higher than that of the first magnetic signal.

In a third step the new magnetic signal is sampled and converted, in a known way, by the converter 116 into a digital signal and processed by the CPU 118 so as to represent the read magnetic patterns or characters.

Preferably, the device 10 configured according to the first embodiment is recommended in case of a movable reading head and the device 110 configured according to the second embodiment is recommended in case of a stationary reading head and movable documents.

However nothing can prevent to use the reading head 12 as disclosed according to the first embodiment in case of devices 110 provided with a stationary head or to use the reading head 112 and the stationary external noise detector 140 in case of devices arranged to read stationary documents.

Advantageously, the device according to both the embodiments, by not requiring shields or other components for shielding electromagnetic noise, is structurally very compact.

More advantageously, a system including the device 10 according to the first embodiment or the device 110 according to the second embodiment, and driving motors 119 (FIG. 6) arranged to move the head 12 or the documents 11 may be configured so that the motors 119 can be placed very close to the respective reading heads.

As a matter of fact, the electromagnetic noise read by the head 12 or 112 and by the second magnetic reader, respectively 40 or 140, can be cancelled by means of the algebraic adders 25 or 125.

Moreover, advantageously, by adopting the device according to the invention, the design and production costs can be reduced, for instance, by avoiding any shielding for cutting electronic noise generated by noising components.

In addition, advantageously, being the quality of the final magnetic signal very high, also the reliability of the read patterns is very high.

Of course, without prejudice to the basic principles of the invention, the details and embodiments may vary, also significantly, with respect to what has been described herein by way of examples only, without departing from the scope of the invention as defined by the claims that follow.

The invention claimed is:

1. A device for decoding magnetic patterns printed on documents, comprising:
   a reading head movable along the documents in order to read the magnetic patterns printed on said documents and having a first magnetic reader comprising a first magnetic core and a first coil having a first inductance value and a first resistance value, wherein the first magnetic reader is arranged to read first magnetic signals, said first magnetic signals being related to the magnetic patterns and to electromagnetic noise due to sources internal and/or external to the device;
   a second magnetic reader comprising a second magnetic core and a second coil having a second inductance value and a second resistance value, wherein the second magnetic reader is arranged to read second magnetic signals related to the electromagnetic noise and positioned such as not to sense or read signals related to the magnetic patterns;
   an adder component arranged to algebraically subtract said second magnetic signals from said first magnetic signals; and
   a converter arranged to convert the resulting signal into a digital signal representing the read magnetic patterns;
   wherein the second magnetic reader is mounted on said movable reading head at a distance of 1-3 mm from the first magnetic reader and from the magnetic patterns so as to be magnetically decoupled from the first magnetic reader and from the magnetic patterns;
   wherein the first coil and the second coil have the same time constant ($\tau$), where $\tau$=inductance/resistance; and
   wherein the second inductance and the second resistance are lower than the first inductance and the first resistance, respectively, and the second coil is arranged substantially perpendicularly to the first coil.

2. The device for decoding magnetic patterns according to claim 1, further comprising:
   a first amplifier connected to the reading head and arranged to amplify said first magnetic signals read by said first magnetic reader; and a second amplifier connected to the second magnetic reader and arranged to amplify said second magnetic signals read by said second magnetic reader.

3. A system for reading and decoding magnetic patterns printed on documents, comprising the device according to claim 2 and at least one driving motor arranged to move the reading head of the device.

4. A system for reading and decoding magnetic patterns printed on documents, comprising the device according to claim 1 and at least one driving motor arranged to move the reading head of the device.

5. A method for decoding magnetic patterns printed on documents, comprising the steps of:
reading first magnetic signals by means of a first magnetic reader, said first magnetic signals belonging to the magnetic patterns and to electromagnetic noise due to internal and/or external sources;
reading second magnetic signals by means of a second magnetic reader positioned such as not to sense or read the magnetic patterns printed on the document, said second magnetic signals belonging only to the electromagnetic noise; and
algebraically subtracting said second magnetic signals from said first magnetic signals thereby obtaining a third magnetic signal corresponding to the magnetic patterns and having a signal-to-noise ratio higher than that of the first magnetic signal;
wherein said steps of reading said first magnetic signals and of reading said second magnetic signals are provided by moving a reader head along the document and the associated magnetic patterns printed on the document, the reader head including the first magnetic reader and the second magnetic reader, the first magnetic reader comprising a first magnetic core and a first coil having a first inductance value and a first resistance value and arranged to read the first magnet signals, the second magnetic reader comprising a second magnetic core and a second coil having a second inductance value and a second resistance value and arranged to read only the second magnet signals and mounted on said reading head at a distance of 1-3 mm from the first magnetic reader and from the magnetic patterns so as to be magnetically decoupled from the first magnetic reader;
wherein the first coil and the second coil have the same time constant ($\tau$), where $\tau$=inductance/resistance; and
wherein the second inductance and the second resistance are lower than the first inductance and the first resistance, respectively, and the second coil is arranged substantially perpendicularly to the first coil.

6. The method according to claim 5, wherein said step of reading first magnetic signals comprises the step of amplifying said first magnetic signals; and wherein said step of reading second magnetic signals comprises the step of amplifying said second magnetic signals.

7. A device for decoding magnetic patterns printed on documents, comprising:
a stationary reading head having a first magnetic reader comprising a first magnetic core and a first coil having a first inductance value and a first resistance value, wherein the first magnetic reader is arranged to read first magnetic signals, said first magnetic signals being related to the magnetic patterns and to electromagnetic noise due to sources internal and/or external to the device, said documents and the associated magnetic patterns being movable in front of said stationary reading head;
a second magnetic reader comprising a second magnetic core and a second coil having a second inductance value and a second resistance value, wherein the second magnetic reader is arranged to read second magnetic signals related to the electromagnetic noise and positioned such as not to sense or read signals related to the magnetic patterns;
an adder component arranged to algebraically subtract said second magnetic signals from said first magnetic signals; and
a converter arranged to convert the resulting signal into a digital signal representing the read magnetic patterns;
wherein the second magnetic reader is positioned at a distance from the stationary reading head in a range of 3-15 mm so as to be magnetically decoupled from the first magnetic reader;
wherein the first coil and the second coil have the same time constant ($\tau$), where $\tau$=inductance/resistance; and
wherein the second inductance and the second resistance are lower than the first inductance and the first resistance, respectively, and the second coil is arranged substantially perpendicularly to the first coil.

8. The device for decoding magnetic patterns according to claim 7, further comprising:
a first amplifier connected to the reading head and arranged to amplify said first magnetic signals read by said first magnetic reader; and
a second amplifier connected to the second magnetic reader and arranged to amplify said second magnetic signals read by said second magnetic reader.

9. A system for reading and decoding magnetic patterns printed on documents, comprising the device according to claim 8 and at least one driving motor arranged to move a document to be read by the stationary reading head of the device.

10. A system for reading and decoding magnetic patterns printed on documents, comprising the device according to claim 7 and at least one driving motor arranged to move a document to be read by the stationary reading head of the device.

11. A method for decoding magnetic patterns printed on documents, comprising the steps of:
reading first magnetic signals by means of a first magnetic reader, said first magnetic signals belonging to the magnetic patterns and to electromagnetic noise due to internal and/or external sources;
reading second magnetic signals by means of a second magnetic reader positioned such as not to sense or read the magnetic patterns printed on the document, said second magnetic signals belonging only to the electromagnetic noise; and
algebraically subtracting said second magnetic signals from said first magnetic signals thereby obtaining a third magnetic signal corresponding to the magnetic patterns and having a signal-to-noise ratio higher than that of the first magnetic signal;
wherein said steps of reading said first magnetic signals and of reading said second magnetic signals are accomplished by moving the document and the associated magnetic patterns printed on the document in front of a stationary reader head, the reader head including the first magnetic reader and the second magnetic reader, the first magnetic reader comprising a first magnetic core and a first coil having a first inductance value and a first resistance value and arranged to read the first magnet signals, the second magnetic reader comprising a second magnetic core and a second coil having a second inductance value and a second resistance value and arranged to read only the second magnet signals and positioned at a distance from the stationary reading head in a range of 3-15 mm so as to be magnetically decoupled from the first magnetic reader;

wherein the first coil and the second coil have the same time constant ($\tau$), where $\tau$=inductance/resistance; and wherein the second inductance and the second resistance are lower than the first inductance and the first resistance, respectively, and the second coil is arranged substantially perpendicularly to the first coil.

12. The method according to claim 11, wherein said step of reading first magnetic signals comprises the step of amplifying said first magnetic signals; and wherein said step of reading second magnetic signals comprises the step of amplifying said second magnetic signals.

* * * * *